US010130085B2

United States Patent
Ishikawa et al.

(10) Patent No.: US 10,130,085 B2
(45) Date of Patent: Nov. 20, 2018

(54) SPOOL BRAKE DEVICE FOR DUAL-BEARING REEL

(71) Applicant: Shimano Inc., Sakai, Osaka (JP)

(72) Inventors: Yuichiro Ishikawa, Sakai (JP); Akira Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 203 days.

(21) Appl. No.: 15/374,790

(22) Filed: Dec. 9, 2016

(65) Prior Publication Data

US 2017/0208785 A1  Jul. 27, 2017

(30) Foreign Application Priority Data

Jan. 22, 2016  (JP) .................................. 2016-010627

(51) Int. Cl.
  *A01K 89/01*  (2006.01)
  *A01K 89/0155*  (2006.01)
(52) U.S. Cl.
  CPC ................ *A01K 89/0155* (2013.01)
(58) Field of Classification Search
  CPC ........ A01K 89/01555; A01K 89/01931; A01K 89/045
  See application file for complete search history.

(56) References Cited

U.S. PATENT DOCUMENTS

| 2014/0110516 A1* | 4/2014 | Niitsuma | A01K 89/01555 242/288 |
| 2014/0110517 A1* | 4/2014 | Niitsuma | A01K 89/01555 242/288 |
| 2017/0208789 A1* | 7/2017 | Numata | A01K 89/01555 |

FOREIGN PATENT DOCUMENTS

JP    2014082937 A    5/2014

* cited by examiner

*Primary Examiner* — Emmanuel M Marcelo
(74) *Attorney, Agent, or Firm* — United IP Counselors, LLC

(57) ABSTRACT

A spool brake device for a dual-bearing reel, the spool brake device includes a spool brake, a rotation detector, and a spool controller. The spool brake can electrically brake a spool during a releasing of a fishing line by applying a braking force to the spool. The rotation detector can electrically detect a rotation of the spool. The spool controller can determine whether a terminal tackle has landed on water based on an output from the rotation detector after a starting of a casting, and can control the spool brake such that the braking force is maintained at a magnitude when a determination that the terminal tackle has landed on water, the magnitude equal to a magnitude of the braking force at a point of time the determination is made that the terminal tackle has landed on water.

18 Claims, 9 Drawing Sheets

SPOOL BRAKE DEVICE FOR DUAL-BEARING REEL

CROSS-REFERENCE TO RELATED APPLICATIONS

This application claims priority to Japanese Patent Application No. 2016-010627 filed on Jan. 22, 2016, the entirety of which is hereby incorporated by reference in its entirety.

BACKGROUND

Technical Field

The present disclosure relates to a spool brake device, and particularly to a spool brake device for a dual-bearing reel, which is electrically controllable.

Background Information

There has been known so far a type of dual-bearing reel in which a spool is electrically controllable (see Japan Laid-open Patent Application Publication No. 2014-82937). In the well-known type of dual-bearing reel, a spool brake device includes a magnet, coils and a control device. The magnet is unitarily rotatable with the spool. The coils are mounted to a reel unit and are opposed to the magnet. The control device adjusts a braking force by performing PWM (Pulse Width Modulation) for electric current flowing through the coils. The control device controls the braking force in accordance with the magnitude of tension on a software basis. In the well-known type of dual-bearing reel, the spool brake device determines whether or not a terminal tackle has landed on water, and finishes performing a brake control after determining that the terminal tackle has landed on water. In determining whether or not the terminal tackle has landed on water, the spool is braked at a predetermined timing in a later phase of casting. Then, whether or not the terminal tackle has landed on water is determined based on a post-braking rotational state (e.g., post-braking acceleration) of the spool.

In the well-known type of dual-bearing reel, the spool brake device brakes the spool at a relatively large predetermined duty cycle (of 90%) after determining that the terminal tackle has landed on water based on the post-braking rotational state of the spool. Therefore, a big difference occurs in the magnitude of a braking force between conditions before and after a water landing of the terminal tackle. This could make an impact on a user.

BRIEF SUMMARY

It is an object of the present disclosure to prevent an impact on a user during a water landing of a terminal tackle.

A spool brake device for a dual-bearing reel according to the present disclosure is a device that brakes a spool capable of winding thereabout a fishing line having a terminal tackle attached to a tip of the fishing line. The spool brake device for a dual-bearing reel includes a spool brake, a spool controller, a rotation detector and a water landing determiner. The spool brake electrically brakes the spool during a releasing of the fishing line. The spool controller electrically controls a braking force of the spool brake. The rotation detector can electrically detect a rotation of the spool. The water landing determiner determines whether or not the terminal tackle has landed on water based on an output from the rotation detector after a starting of a casting. When the water landing determiner determines that the terminal tackle has landed on water, the spool controller controls the spool brake such that the braking force is maintained at a magnitude at a point of time of the determination made by the water landing determiner that the terminal tackle has landed on water.

According to the spool brake device, the water landing determiner determines whether or not the terminal tackle has landed on water based on the output from the rotation detector after a casting, and determines that the terminal tackle has landed on water, for instance, when the rotational velocity of the spool becomes slow. When the water landing determiner determines that the terminal tackle has landed on water, the spool controller controls the spool brake such that the braking force is maintained at a magnitude at this point of time. When the water landing determiner herein determines that the terminal tackle has landed on water, the braking force is maintained at a magnitude at this point of time. Hence, the braking force becomes unlikely to vary during a water landing of the terminal tackle. Accordingly, a negative impact on a user is prevented.

The spool brake device for a dual-bearing reel can further include a rotational velocity calculator that calculates a rotational velocity of the spool based on the rotation of the spool detected by the rotation detector. The water landing determiner can determine that the terminal tackle has landed on water when the calculated rotational velocity is less than or equal to a predetermined value. According to this construction, a water landing of the terminal tackle can be determined based on a gradual reduction of the rotational velocity. Hence, it is possible to simplify an algorithm for determining a water landing of the terminal tackle.

When the rotational velocity of the spool becomes greater than a maximum value after a casting, the spool controller can control the spool brake such that the braking force gradually reduces with a reduction in the rotational velocity of the spool. According to this configuration, a surplus braking force is unlikely to act on the spool during a flying of the terminal tackle. Hence, the terminal tackle can fly a long distance.

The spool brake device for a dual-bearing reel can further include an electric power breaker that can block a supply of an electric power to the rotation detector when the water landing determiner determines that the terminal tackle has landed on water. According to this construction, the amount of the electric power consumed by the rotation detector can be reduced, and the duration of a brake control can be extended.

The spool controller can stop controlling the spool brake when a predetermined period of time elapses after the determination made by the water landing determiner that the terminal tackle has landed on water. According to this construction, the braking force does not act on the spool in a winding of the fishing line. Hence, the fishing line can be easily wound up. Additionally, when supply of the electric power to the rotation detector is reactivated at this timing, preparation of the brake control can be made for the next casting.

Overall, according to the present disclosure, it is possible to prevent an impact on a user in determining a water landing of the terminal tackle.

BRIEF DESCRIPTION OF THE DRAWINGS

Referring now to the attached drawings which form a part of this original disclosure.

DETAILED DESCRIPTION OF EMBODIMENTS

Figure 1:
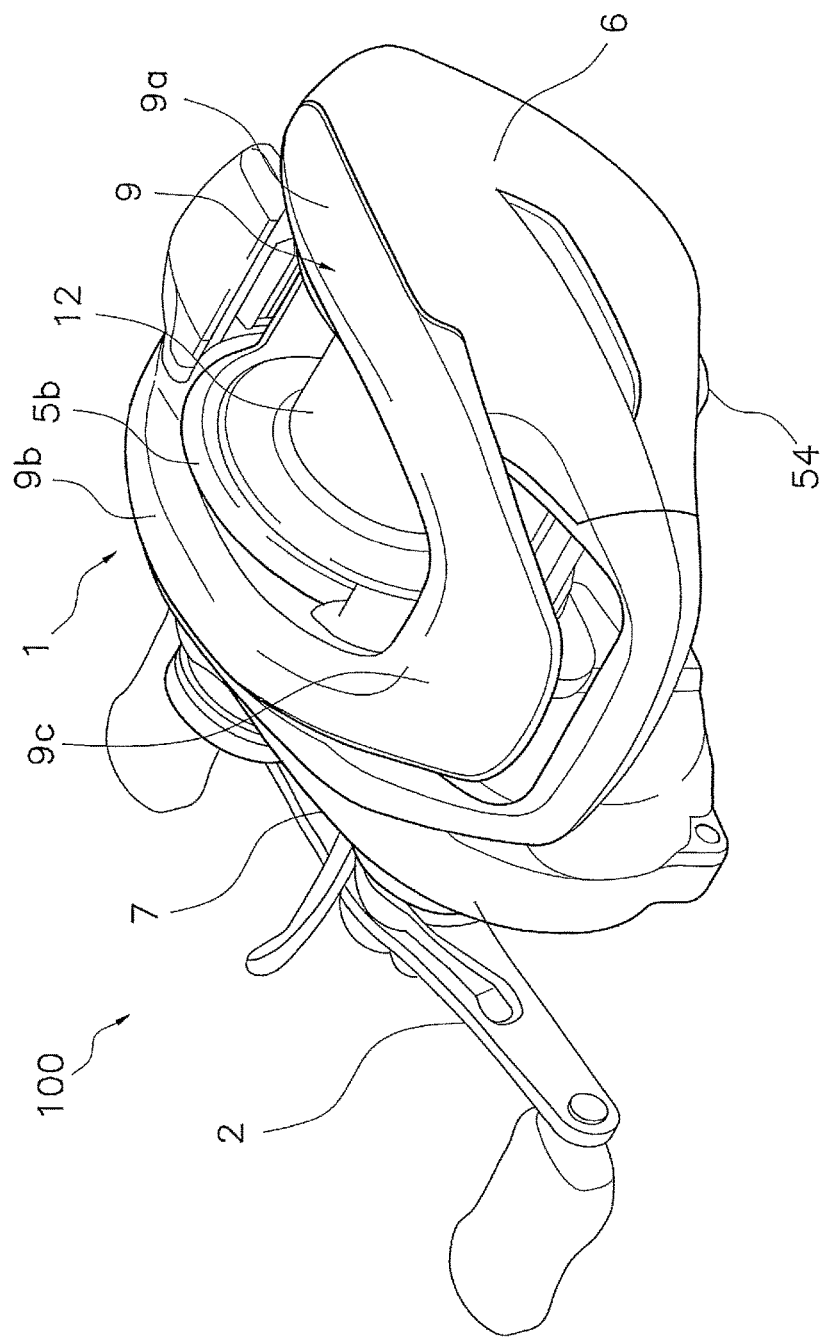
FIG. 1 is a perspective view of a dual-bearing reel employing a preferred embodiment of the present disclosure.
Figure 2:
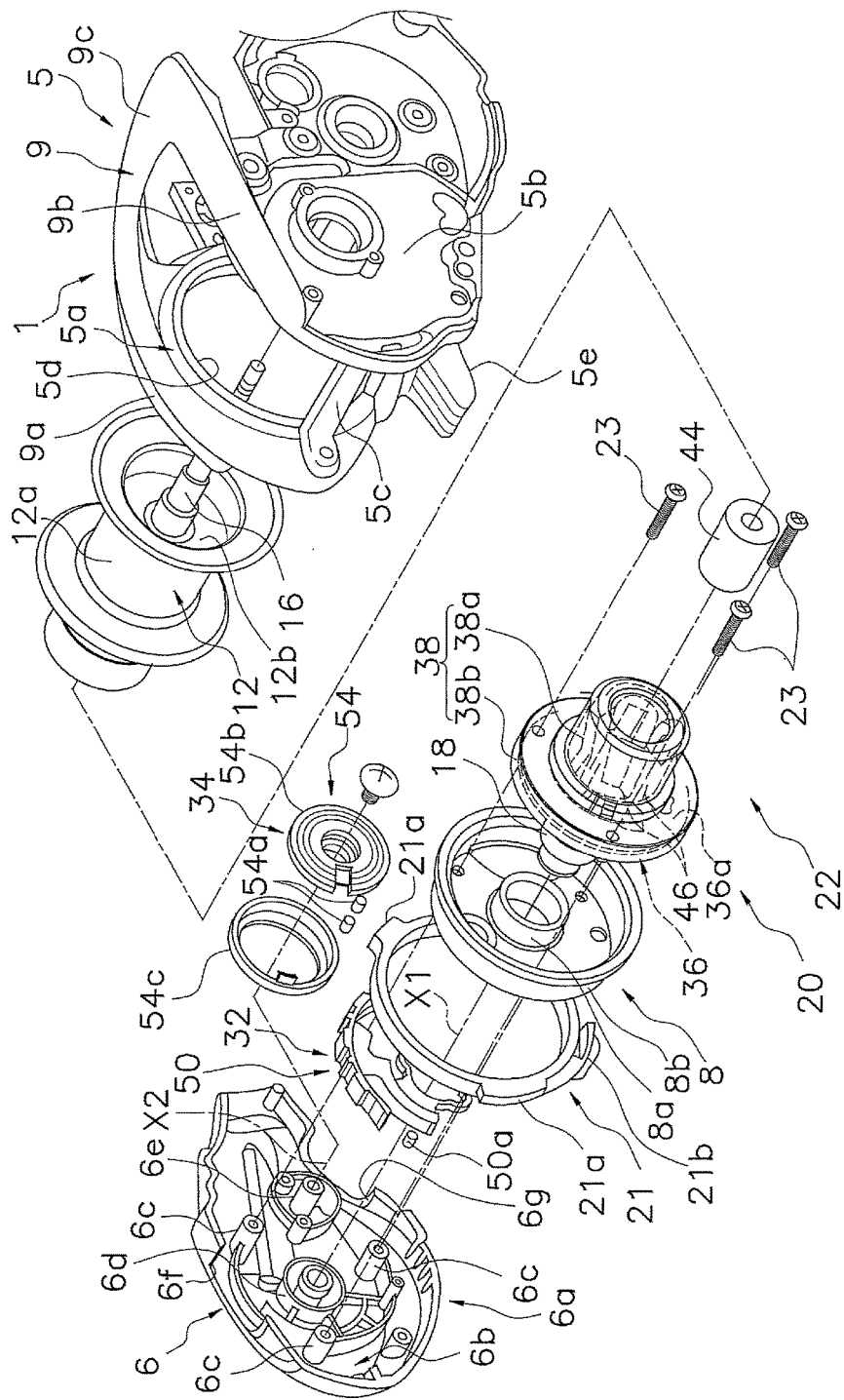
FIG. 2 is an exploded perspective view of the dual-bearing reel including a spool brake mechanism.

As shown in FIGS. 1 and 2, a dual-bearing reel 100 employing a preferred embodiment of the present disclosure includes a reel unit 1, a handle 2, a spool 12 and a spool brake mechanism 20 (see FIG. 2) to electrically brake the spool 12. The spool brake mechanism 20 is an exemplary spool brake device for the dual-bearing reel 100.

The reel unit 1 includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is opposed to the first side plate 5a. The coupling portions 5c couple the first side plate 5a and the second side plate 5b. The first side plate 5a includes a circular opening 5d enabling the spool 12 to pass through the first side plate 5a. Among the plural coupling portions 5c, the one coupling portion 5c coupling the first side plate 5a and the second side plate 5b on the bottom side is provided with a fishing rod attachment leg 5e to be attached to a fishing rod. The spool brake mechanism 20 is detachably mounted to a position about the opening 5d on the first side plate 5a of the frame 5. The first side cover 6 is detachably mounted to the first side plate 5a of the frame 5. The first side cover 6 includes a cover body 6a and a shaft support portion 8 mounted to an inner surface 6b of the cover body 6a.

A plurality of (e.g., three) fixation bosses 6c are provided on the inner surface 6b of the cover body 6a so as to fix the shaft support portion 8 to the cover body 6a. Additionally, a first mount boss 6d and a second mount boss 6e are separately provided on the inner surface 6b so as to enable a first selector 32 (to be described) and a second selector 34 (to be described) of the spool brake mechanism 20 to be rotatably mounted thereto. The first mount boss 6d has a tubular shape formed about a first axis X1. The second mount boss 6e has a shape formed about a second axis X2 arranged in parallel to the first axis X1. The second axis X2 is arranged forward of the first axis X1 and adjacent to the fishing rod attachment leg 5e. The first axis X1 is arranged coaxially to a spool shaft 16 (to be described) in a condition that the cover body 6a is mounted to the first side plate 5a.

Figure 4:
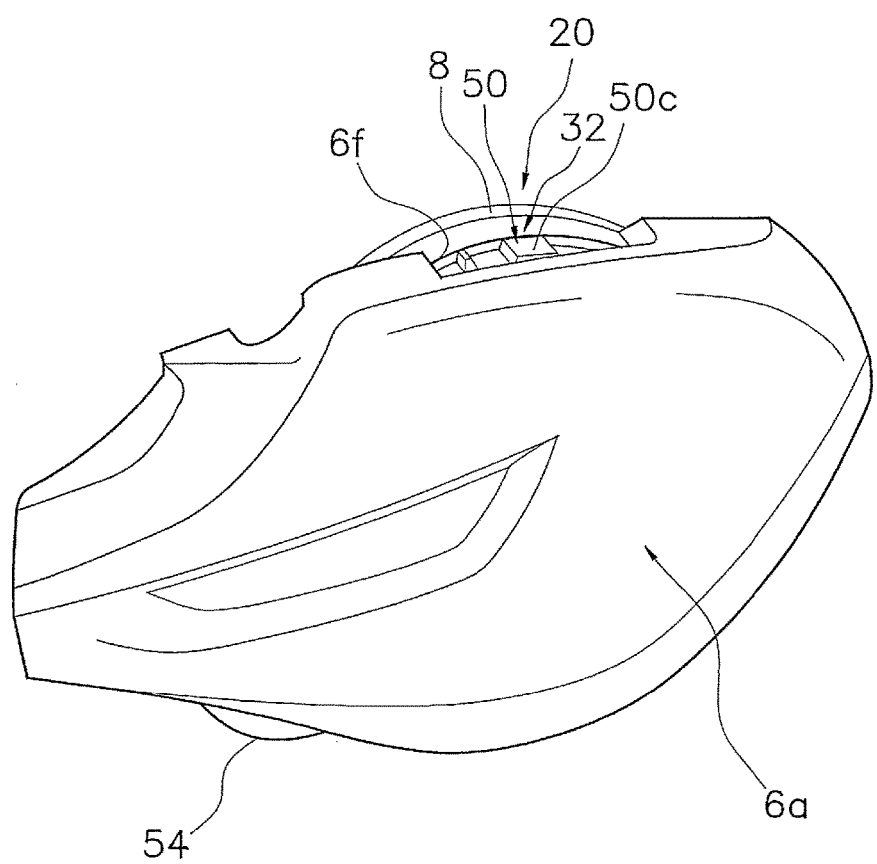
FIG. 4 is a perspective view of the spool brake mechanism.

The cover body 6a is disposed in contact with the thumb rest 9 and is covered with a first bulge 9a (to be described) of the thumb rest 9. The part of the cover body 6a, covered with the first bulge 9a, includes a first opened part 6f. The first opened part 6f has a rectangular shape and enables the first selector 32 to be exposed through the first opened part 6f. Therefore, as shown in FIG. 4, the first selector 32 is inoperable unless the first side cover 6 is detached from the frame 5. The cover body 6a has a second opened part 6g below the second mount boss 6e. The second opened part 6g has a rectangular shape and enables the second selector 34 to outwardly protrude through the second opened part 6g. Therefore, the second selector 34 is operable even when fishing is carried out.

One end of the spool shaft 16 of the spool 12 is rotatably supported by the shaft support portion 8. The shaft support portion 8 is a flat cylindrical member having a partially closed end. The shaft support portion 8 includes a tubular bearing accommodation part 8a in its center. The bearing accommodation part 8a protrudes from the inner surface of the shaft support portion 8 and accommodates a bearing 18 whereby the aforementioned one end of the spool shaft 16 is rotatably supported. An attachment/detachment ring 21 is rotatably mounted to an outer peripheral surface 8b of the shaft support portion 8. The attachment/detachment ring 21 is provided for attaching/detaching the shaft support portion 8 to/from a position about the opening 5d on the first side plate 5a. The attachment/detachment ring 21 detachably attaches the shaft support portion 8 to the first side plate 5a with a heretofore known bayonet structure. The attachment/detachment ring 21 has a plurality of (e.g., three) pawls 21a and an operation knob 21b. The pawls 21a protrude outward from the outer peripheral surface of the attachment/detachment ring 21 in a radial direction from a first axis X1. The operation knob 21b is provided for performing an attachment/detachment operation. The plural pawls 21a respectively have a slope with a gradually decreasing thickness, and are engaged with a plurality of engaging grooves (not shown in the drawings) provided about the opening 5d.

When the attachment/detachment ring 21 is rotated in one direction (e.g., counterclockwise direction in FIG. 2) by downwardly operating the operation knob 21b with a fingertip, the pawls 21a are disengaged from the engaging grooves, and the shaft support portion 8 and the first side cover 6 are unlocked from the first side plate 5a. Contrarily, when the attachment/detachment ring 21 is rotated in the other direction by, for instance, upwardly operating the operation knob 21b with the fingertip, the pawls 21a are engaged with the engaging grooves, and the shaft support portion 8 and the first side cover 6 are locked to the first side plate 5a. The shaft support portion 8 is fixed to the first side cover 6 together with part of the constituent elements of the spool brake mechanism 20 by a plurality of (e.g., three) bolt members 23. In the condition that the shaft support portion 8 is fixed to the first side cover 6, the attachment/detachment ring 21 is restricted from moving in a spool shaft direction and is rotatable with respect to the shaft support portion 8.

As shown in FIGS. 1 and 2, the thumb rest 9 includes the first bulge 9a, a second bulge 9b and a third bulge 9c. The first bulge 9a outwardly bulges from the upper part of the first side plate 5a. The second bulge 9b outwardly bulges from the upper part of the second side plate 5b. The third bulge 9c forwardly bulges, and couples the first side plate 5a and the second side plate 5b at the front part of the frame 5.

The handle 2 is rotatably supported by the reel unit 1. The spool 12 is rotatably held by the reel unit 1 and is disposed between the first side plate 5a and the second side plate 5b.

Rotation of the handle 2 is transmitted to the spool 12 through a rotation transmission mechanism (not shown in the drawings). A clutch mechanism is mounted to an intermediate part of the rotation transmission mechanism. The clutch mechanism is capable of switching the spool 12 between an off state and an on state. In the off state, the spool 12 becomes freely rotatable. In the on state, the rotation of the handle 2 is transmitted to the spool 12.

Figure 3:
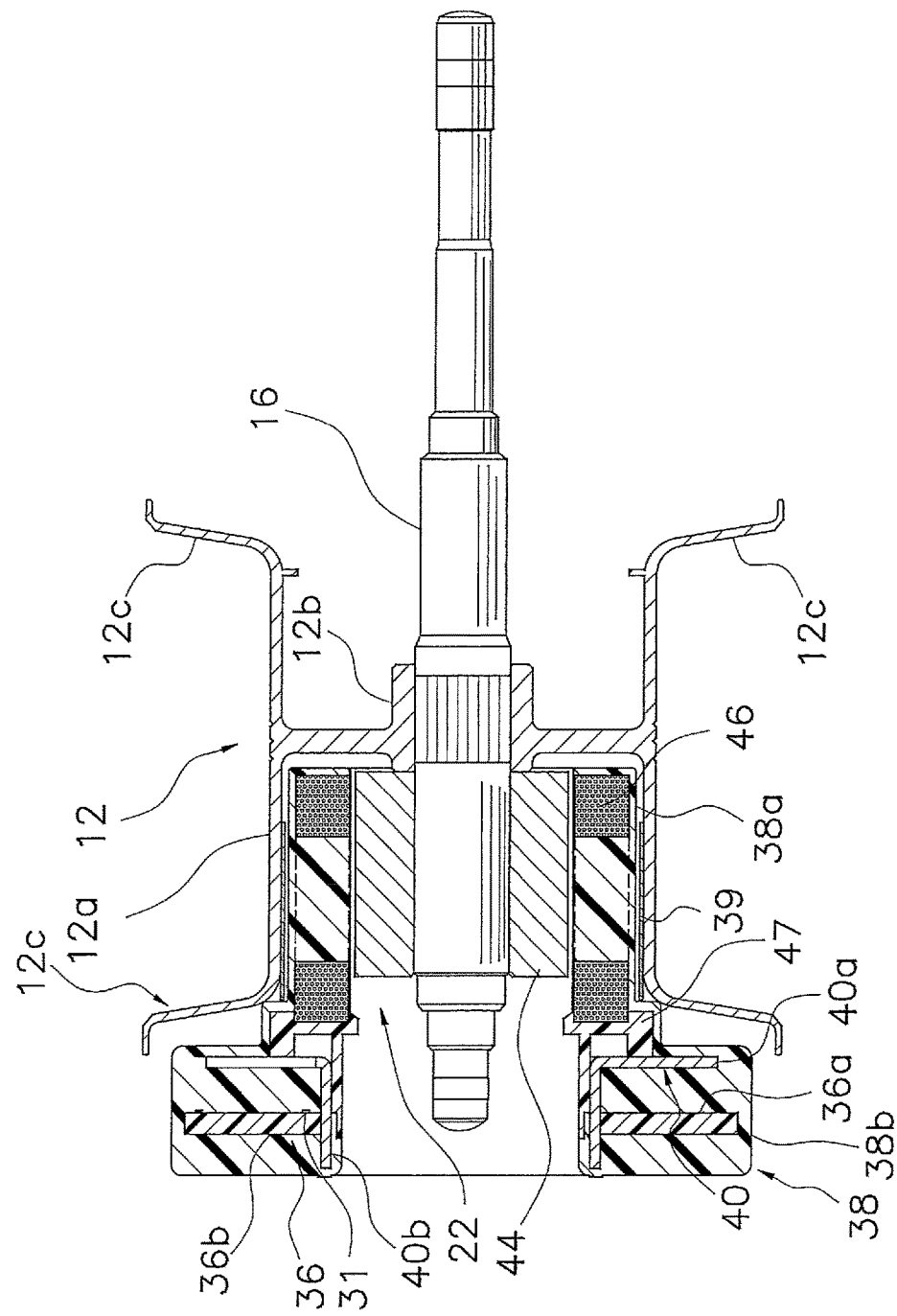
FIG. 3 is a cross-sectional view of a spool brake unit in a condition that a circuit board and coils are covered with a cover member.

As shown in FIG. 3, the spool 12 includes a bobbin trunk 12a, a tubular part 12b and a pair of flanges 12c. The bobbin trunk 12a is capable of having the fishing line wound about the bobbin trunk 12a. The tubular part 12b is integrated with the bobbin trunk 12a and is fixed onto the spool shaft 16. The flanges 12c are provided on both axial ends of the bobbin trunk 12a and respectively have a large diameter. The spool shaft 16 is coupled to the inner peripheral surface of the tubular part 12b in a unitarily rotatable state. The aforementioned one end of the spool shaft 16 is rotatably supported by the shaft support portion 8 through the bearing 18. The other end of the spool shaft 16 is rotatably supported by the second side cover 7 through a bearing (not shown in the drawings).

<Spool Brake Mechanism>

As shown in FIGS. 2, 3, 4 and 7, the spool brake mechanism 20 includes a spool brake unit 22 and a spool control unit 24 for controlling the spool brake unit 22. The spool brake unit 22 is an exemplary spool brake.

The spool brake unit 22 brakes the spool 12 in an electrically controllable manner. The spool brake unit 22 includes a brake magnet 44 mounted to the spool 12 in a unitarily rotatable state, a plurality of coils 46 connected in series, and a switch element 48 (see FIG. 7). The brake magnet 44 is mounted to the spool shaft 16 in a unitarily rotatable state. In the present preferred embodiment, the brake magnet 44 is fixed to the spool shaft 16 by adhesion. The brake magnet 44 is a cylindrical magnet magnetized to have magnetic anisotropy and has a plurality of magnetic poles. The plural coils 46 are disposed on the outer peripheral side of the brake magnet 44 and are aligned at predetermined intervals in a tubular arrangement. The coils 46 are attached to a circuit board 36 (to be described) through a coil attaching member 47. Coreless coils are herein employed as the coils 46 for preventing cogging in order to smoothly rotate the spool 12. Moreover, the coils 46 are not provided with a yoke. Wires of the coils 46 are respectively wound in a roughly rectangular shape. The wound wires are opposed to the brake magnet 44 and are disposed within the magnetic field of the brake magnet 44. Both ends of the plural coils 46 are connected in series and are electrically connected to the switch element 48 mounted to the circuit board 36. In the present preferred embodiment, four coils 46 are provided. Each of the coils 46 has a circular-arc curved shape. The plural coils 46 are circumferentially disposed at intervals and the entirety of the plural coils 46 has a roughly tubular shape. The switch element 48 is implemented by, for instance, a field effect transistor.

The spool brake unit 22 changes a duty cycle by causing the switch element 48 to switch on and off electric current generated by a relative rotation between the brake magnet 44 and the coils 46. Accordingly, the spool 12 is braked with a variable magnitude of braking force. The braking force generated by the spool brake unit 22 is strengthened with an increase in a length of a switch-on time by the switch element 48 (i.e., with an increase in a magnitude of a duty cycle D). The switch element 48 is connected to an electric storage element 51 through a rectifier circuit 49. The electric storage element 51 stores electric power generated by the coils 46 during a casting. The electric storage element 51 functions as a power source to supply electric power to the spool control unit 24 and an electric component connected to the spool control unit 24. The electric storage element 51 is implemented by, for instance, an electrolytic capacitor.

Figure 7:
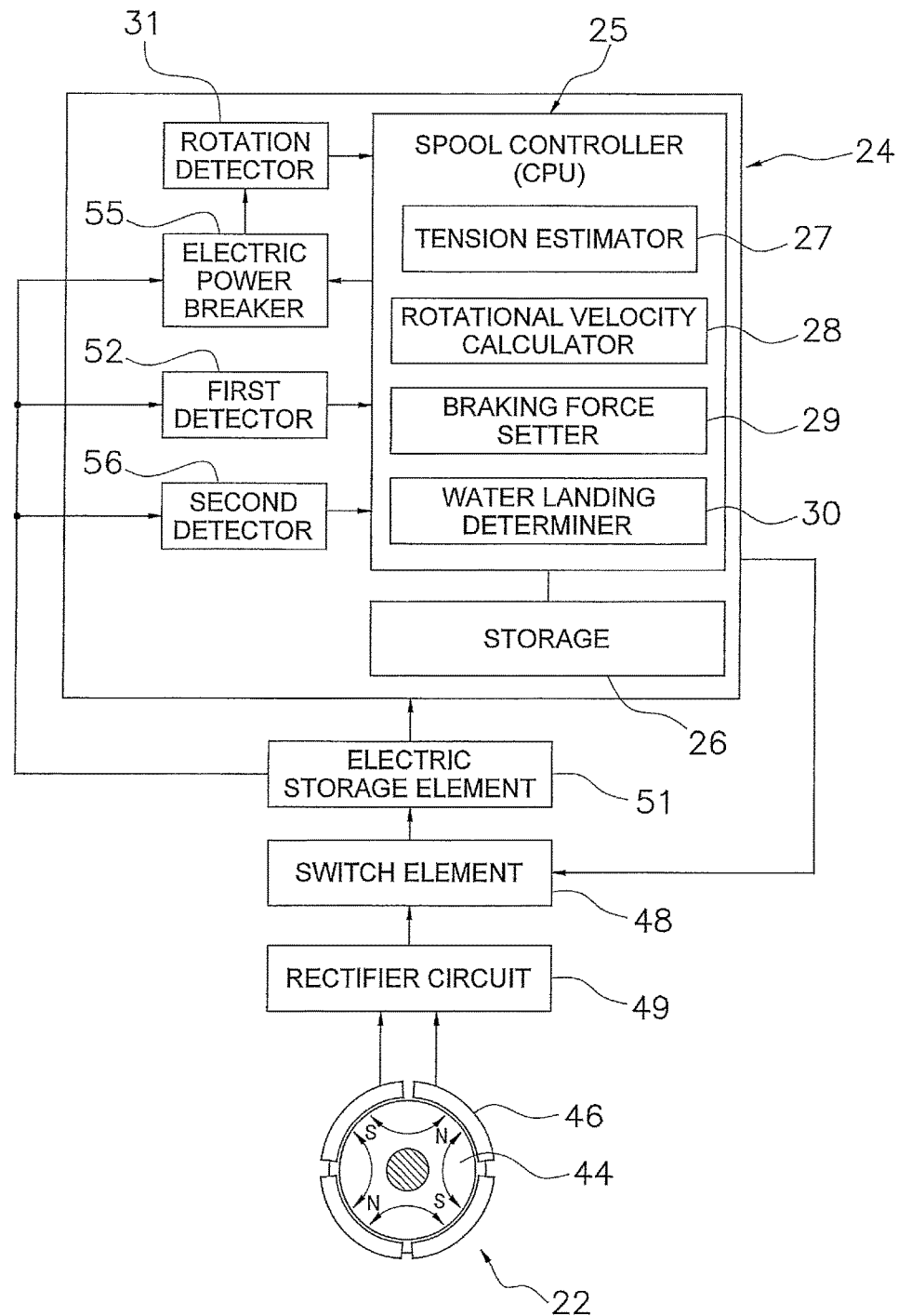
FIG. 7 is a block diagram of the spool brake mechanism.

As shown in FIG. 7, the spool control unit 24 includes a spool controller 25 and a storage 26. The spool controller 25 is implemented by a microcomputer including a ROM (such as a PROM, an EPROM, an EEPROM, a Flash EEPROM, an optical memory, a magnetic memory, or a flash memory), a RAM (such as a SDRAM, a DDR SDRAM, or a Rambus DRAM) and a CPU (such as a RISC microprocessor, a CISC microprocessor, an ASIC microprocessor, a Superscalar Processor, or a Digital Signal microprocessor). The CPU of the spool controller 25 can also be a programmable logic device (PLD) such as a programmable logic array device (PLA), a programmable array logic device (PAL), a generic array logic device (GAL), a complex programmable logic device (CPLD), or a field-programmable gate array device (FPGA). The CPU of the spool controller 25 is an example of a spool brake controlling means. The storage 26 is implemented by a non-volatile memory such as an EEPROM, ferroelectric RAM, optical memory, or a flash memory. A rotation detector 31, a first detector 52, a second detector 56 and an electric power breaker 55 are electrically connected to the spool controller 25. The rotation detector 31, the first detector 52, the second detector 56 and the electric power breaker 55 are implemented at least partially by hardware mounted to the circuit board 36. The electric power breaker 55 is implemented by, for instance, a switching transistor to be on/off controlled by the spool controller 25. Thus, the electric power breaker 55 is an example of an electric power breaking means.

The spool controller 25 includes a tension estimator 27, a rotational velocity calculator 28, a braking force setter 29 and a water landing determiner 30 as functional constituent elements implemented by hardware and/or software. The rotational velocity calculator 28 calculates a rotational velocity ω of the spool 12 based on an output signal from the rotation detector 31. The tension estimator 27 estimates a tension F acting on the fishing line based on the information outputted from the rotational velocity calculator 28. The braking force setter 29 sets a first duty cycle D1 reducing with an elapse of time and a second duty cycle D2 to be described. The water landing determiner 30 determines a water landing of a terminal tackle based on the output from the rotation detector 31 after a starting of a casting. Specifically, the water landing determiner 30 determines that the terminal tackle has landed on water when the rotational velocity ω of the spool 12 became a water landing determining rotational velocity ωe (e.g., 2300 rpm) or less during casting. The water landing determining rotational velocity ωe is an exemplary predetermined rotational velocity.

The tension F can be calculated by a rate of change (Δω/Δt) of the rotational velocity ω of the spool 12 and an inertia moment J of the spool 12. When the rotational velocity of the spool 12 varies in casting, the rotational velocity at this time is different from the rotational velocity of the spool 12 independently and freely rotating without receiving a tension from the fishing line. The difference is attributed to a rotational driving force (i.e., torque) generated by the tension from the fishing line. A driving torque T can be expressed with the following equation (1), where the rate of change of the rotational velocity at this time is set to be (Δω/Δt).

$$T = J \times (\Delta\omega/\Delta t) \quad (1)$$

When the driving torque T is calculated by the equation (1), the tension F can be calculated with the radius of a point of action of the fishing line (normally 15 to 20 mm). Therefore, in the present preferred embodiment, the tension F can be estimated by calculation with the rate of change of the rotational velocity ω.

The spool controller 25 changes the braking force (duty cycle D) by performing a duty control for the switch element 48. The spool controller 25 changes the braking force in accordance with the tension F estimated by the tension estimator 27 and a reference tension Fr. The magnitude of the reference tension Fr is set in accordance with brake modes. It should be noted that in the present preferred embodiment, the reference tension Fr is set to be "0". The storage 26 stores a plurality of data sets associated with brake modes.

Figure 5:
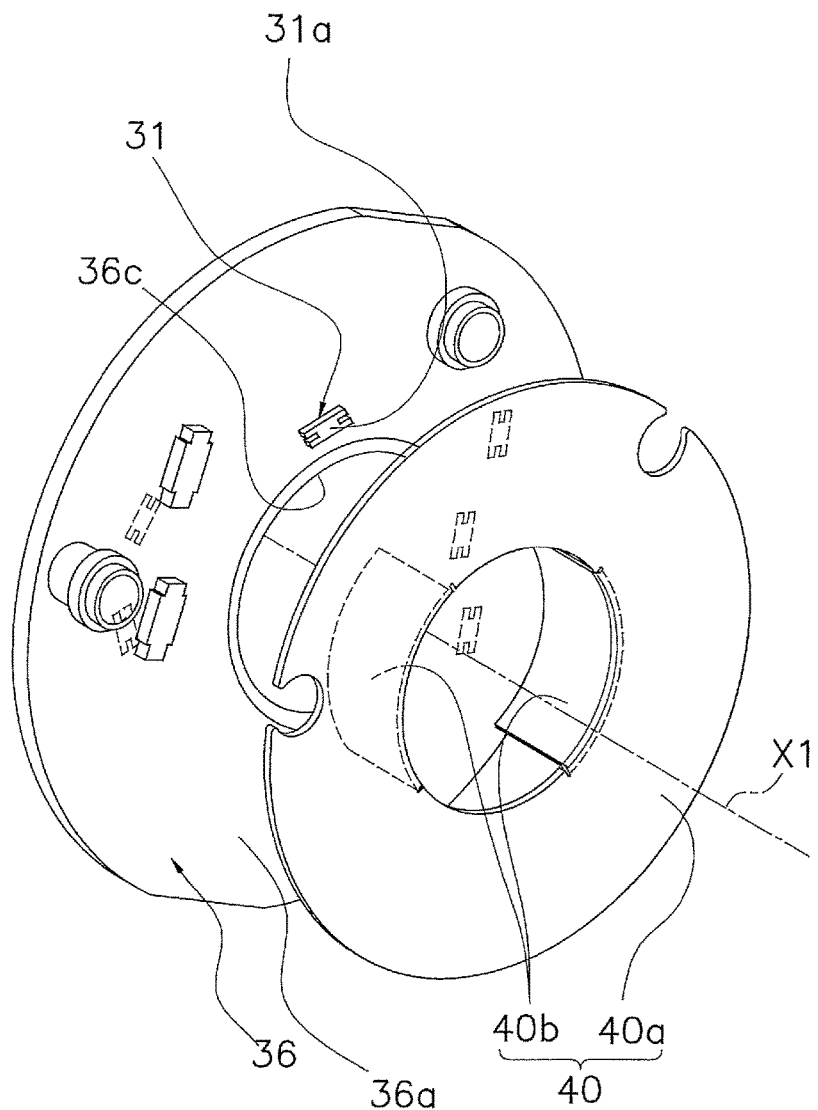
FIG. 5 is an exploded perspective view of the circuit board and a magnetic flux shield member.
Figure 6:
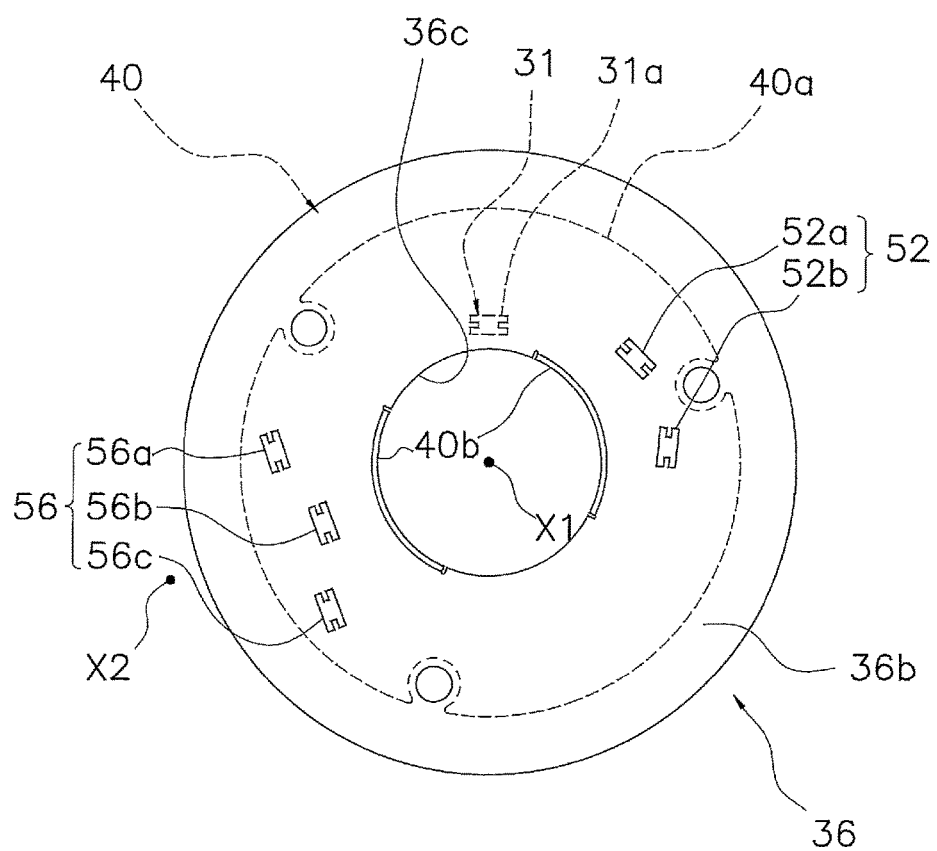
FIG. 6 is a bottom view of the circuit board seen from its second surface side.

Moreover, the spool brake mechanism 20 further includes the rotation detector 31 shown in FIGS. 5 and 7, the first selector 32, the second selector 34, the circuit board 36, a cover member 38, a first magnetic flux shield member 39 and a second magnetic flux shield member 40, which are shown in FIGS. 2, 3 and 4. As shown in FIGS. 3, 5 and 6, the rotation detector 31 includes a hall element 31a. The hall element 31a is mounted to the inner peripheral region of a first surface 36a of the circuit board 36, and is located in a position opposed to a gap between an adjacent two of the four coils 46. The hall element 31a can be a low-cost sensor that only turns on and off in accordance with predetermined rotational phases of the brake magnet 44. The rotation detector 31 is provided for calculating the rotational velocity ω of the spool 12. Thus, the rotation detector 31 is an example of a rotation detecting means. Additionally, a rotational acceleration am and the tension F acting on the fishing line can be also estimated based on variation in the rotational velocity ω of the spool 12 with time.

The first selector 32 can be provided for selecting any one of a plurality of brake modes of the spool brake unit 22 in accordance with types of fishing line or so forth. In the present preferred embodiment, for instance, one of four brake modes is selectable in accordance with types of fishing line.

The first selector 32 includes a first selection operating portion 50 and the first detector 52 (see FIGS. 6 and 7). The first selection operating portion 50 includes at least one (e.g., two) first magnet 50a. The first detector 52 is opposed to the two first magnets 50a and detects the selection position of the first selection operating portion 50.

The first selection operating portion 50 is mounted to the reel unit 1 such that the first selection operating portion 50 is movable within a first range divided into positions corresponding to a plurality of levels. In the present preferred embodiment, the first selection operating portion 50 is rotatably mounted to the inner surface 6b of the cover body 6a such that the first selection operating portion 50 is settable in, for instance, any one of the positions corresponding to three levels within the first range. The first selection operating portion 50 includes a lever member 50b to which the (e.g., two) first magnets 50a are mounted. The lever member 50b includes a first exposed part 50c on its tip. The first exposed part 50c curves in a circular-arc shape and includes a plurality of convex parts 50d. The convex parts 50d are located on the surface of the first exposed part 50c, and are circumferentially aligned at intervals. The lever member 50b is attached to the outer peripheral surface of the first mount boss 6d such that the lever member 50b is rotatable about the first axis X1 within the first range. The first range is an angular range of for instance, 30 degrees or less. In the present preferred embodiment, the first mount boss 6d is disposed concentrically to the spool shaft 16. Thus, the first selection operating portion 50 is rotated about the spool shaft 16. In the condition that the first selection operating portion 50 is mounted to the first side cover 6, the first exposed part 50c is exposed through the first opened part 6f while protruding therefrom. However, in the condition that the first side cover 6 is mounted to the first side plate 5a, the first opened part 6f is covered with the thumb rest 9 and thus the first exposed part 50c of the first selection operating portion 50 hides in the reel unit 1. With the construction, it is possible to avoid a situation that the adjusted condition is changed against a user's intention in carrying out fishing.

As shown in FIGS. 5 and 6, the first detector 52 is disposed on an outer peripheral region of a second surface 36b of the circuit board 36, and away from the brake magnet 44. The first detector 52 includes two hall elements 52a and 52b. The hall elements 52a and 52b are disposed on the second surface 36b such that they can be opposed to the two first magnets 50a. The two hall elements 52a and 52b can be low-cost elements similar to the hall element 31a, and are disposed about the first axis X1 at an interval.

The second selector 34 is provided for selecting any one of a plurality of brake types. The magnitude of braking force to be used as a basis is differently set for the brake types. In the present preferred embodiment, any one of eight brake types is selectable by the second selector 34. The eight brake types are composed of Type 1 to Type 8. In the eight brake types, the magnitude of the braking force increases in the order of Type 1 to Type 8. The second selector 34 includes a second selection operating portion 54 and the second detector 56. The second selection operating portion 54 includes at least one (e.g., three) second magnet 54a. The second detector 56 is opposed to three second magnets 54a and detects the adjustment position of the second selection operating portion 54.

The second selection operating portion 54 is mounted to the reel unit 1 such that the second selection operating portion 54 is movable within a second range divided into positions corresponding to a plurality of levels. In the present preferred embodiment, the second selection operating portion 54 is rotatably mounted to the inner surface 6b of the cover body 6a such that the second selection operating portion 54 is settable in, for instance, any one of the positions corresponding to five levels within the second range. The second range is an angular range of, for instance, 120 degrees or less. The second selection operating portion 54 includes an operating portion body 54b and a second exposed part 54c. The operating portion body 54b is a member to which the (e.g., three) second magnets 54a are mounted. The second exposed part 54c is fixed to the operating portion body 54b by, for instance, an elastic coupling. The operating portion body 54b is attached to the inner surface 6b of the cover body 6a by a screw member, and the screw member is screwed into the second mount boss 6e such that the operating portion body 54b is rotatable about the second axis X2. In the condition that the first side cover 6 is mounted to the first side plate 5a, the second exposed part 54c is exposed through the second opened part 6g. With this construction, the position of the second selection operating portion 54 can be adjusted with a fingertip of the user's hand that is holding the dual-bearing reel 100 while carrying out fishing.

As shown in FIG. 6, the second detector 56 is disposed on the outer peripheral region of the second surface 36b of the circuit board 36, and is disposed away from the brake magnet 44. The second detector 56 is disposed on the second surface 36b of the circuit board 36, and is disposed away from the first detector 52 substantially at an angular interval of 180 degrees. The second detector 56 includes three hall elements 56a, 56b and 56c. The three hall elements 56a, 56b and 56c are disposed on the second surface 36b of the circuit board 36 such that they can be opposed to the three second magnets 54a. The three hall elements 56a, 56b and 56c can be low-cost elements similar to the hall element 31a, and are disposed about the second axis X2 at intervals.

The circuit board 36 has a disc shape having a through hole 36c. The circuit board 36 is mounted to one of the surfaces of the shaft support portion 8, i.e., the surface opposed to the spool 12, and is disposed on the outer peripheral side of the bearing accommodation part 8a. The circuit board 36 includes the first surface 36a and the second surface 36b. The first surface 36a is the surface to which the coils 46 are mounted. The second surface 36b is on the opposite side of the first surface 36a. The circuit board 36 is fixed to the first side cover 6 together with the shaft support portion 8, the cover member 38 and the second magnetic flux shield member 40 by the bolt members 23.

As shown in FIGS. 2 and 5, the cover member 38 is a stepped tubular member made of a synthetic resin and is provided for insulating the circuit board 36, the coils 46 and the electric component mounted to the circuit board 36. The cover member 38 includes a first cover part 38a and a second cover part 38b. The first cover part 38a covers the tips, the inner peripheral parts and the outer peripheral parts of the plural coils 46. The second cover part 38b is integrated with the first cover part 38a, and covers the outer peripheral part, the inner peripheral part, the first surface 36a and the second surface 36b of the circuit board 36. The first cover part 38a is disposed on the outer peripheral side of the brake magnet 44. Put differently, the cover member 38 seals the circuit board 36 by covering the entire surface of the circuit board 36 to which the coils 46 and the electric component including the detectors are mounted.

As shown in FIG. 3, the first magnetic flux shield member 39 is mounted to the inner peripheral surface of the bobbin trunk 12a of the spool 12, and is thereby unitarily rotatable with the spool 12. The first magnetic flux shield member 39 is a tubular member made of iron. The first magnetic flux shield member 39 is provided for increasing the magnetic flux density of the brake magnet 44 in the surroundings of the coils 46. The first magnetic flux shield member 39 is also provided for making the rotation detector 31 unlikely to be affected by the magnetic flux of the brake magnet 44.

As shown in FIGS. 5 and 6, the second magnetic flux shield member 40 is a circular member made of, for instance, an iron plate. The second magnetic flux shield member 40 is provided for shielding the magnetic flux of the brake magnet 44 directed toward the first detector 52 and the second detector 56. With the second magnetic flux shield member 40 provided, the first detector 52 and the second detector 56 can accurately detect the first magnets 50a and the second magnets 54a and are unaffected by the magnetic flux of the brake magnet 44. The second magnetic flux shield member 40 is fixed by the bolt members 23 to the first side cover 6 together with the shaft support portion 8 and the circuit board 36 sealed by the cover member 38.

The second magnetic flux shield member 40 includes a first shield part 40a having a ring shape and a pair of second shield parts 40b. The first shield part 40a is fixed to the coil attaching member 47 by, for instance, adhesion. The second shield parts 40b extend from the first shield part 40a, and each has a cross section made in the shape of a circular arc arranged about the first axis X1. The first shield part 40a is opposed to the first surface 36a of the circuit board 36 at an interval.

The pair of second shield parts 40b is located at an angular interval of 180 degrees about the first axis X1 so as to prevent the magnetic flux of the brake magnet 44 from being directed to the first detector 52 and the second detector 56. The second shield parts 40b are disposed in positions opposed to the first detector 52 and the second detector 56. The axial length of each second shield part 40b is set such that each second shield part 40b protrudes from the second surface 36b of the circuit board 36 but does not slightly reach the first side cover 6-side end surface of the cover member 38. With the construction, the magnetic flux of the brake magnet 44 is prevented from being directed to the first detector 52 and the second detector 56. It should be noted that the second magnetic flux shield member 40 is covered with the cover member 38, and is thus invisible from outside.

In using a different type of fishing line from the previously used one, the spool brake mechanism 20 constructed as described above requires a detachment of the first side cover 6 from the reel unit 1. Specifically, when the attachment/detachment ring 21 is rotated in one direction (e.g., counterclockwise direction in FIG. 2) by downwardly operating the operating knob 21b disposed in the rear part of the dual-bearing reel 100 with a fingertip, the spool brake mechanism 20, including the circuit board 36, the first side cover 6 and so forth, is detached from the reel unit 1. This condition is shown in FIG. 4. Consequently, the first selection operating portion 50 of the first selector 32 is exposed through the first opened part 6f This enables an operation of selecting a suitable brake mode in accordance with the type of fishing line. When this operation is finished, the spool brake mechanism 20 is put into contact with the first side plate 5a. Then, when the attachment/detachment ring 21 is rotated in the other direction by, for instance, upwardly operating the operation knob 21b with a fingertip, the spool brake mechanism 20 is attached to the frame 5.

Figure 8:
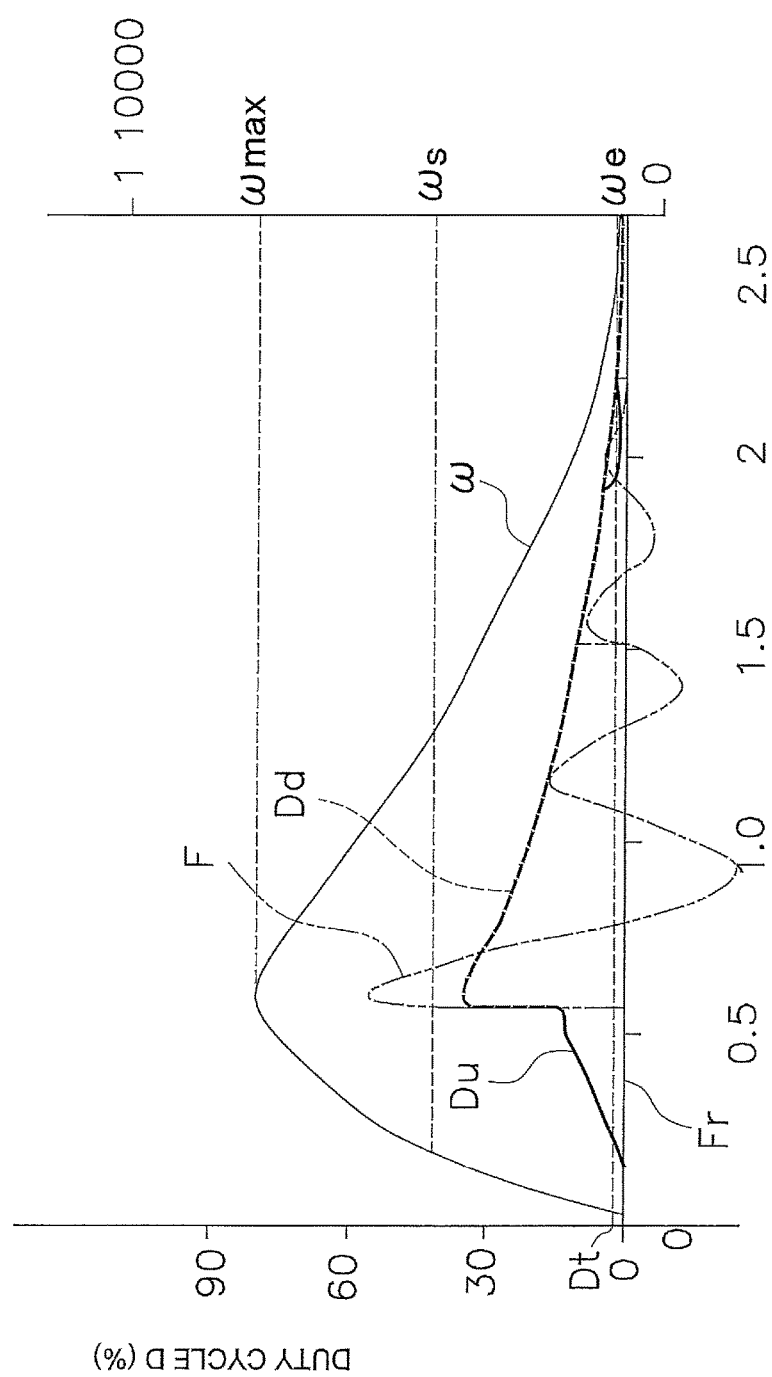
FIG. 8 is a chart explaining a variation in a rotational velocity of a spool and a braking force during a casting.

Next, a control action performed by the spool controller 25 in casting will be schematically explained with reference to the chart of FIG. 8. It should be noted that in FIG. 8, an elapsed time t from a starting of a casting is represented in the horizontal axis, whereas the rotational velocity ω of the spool 12 and the duty cycle D of the braking force are represented in the vertical axis. It should be noted that in the present preferred embodiment, the duty cycle D includes an increasing duty cycle Du and a decreasing duty cycle Dd. The increasing duty cycle Du is used during a starting of a braking, whereas the decreasing duty cycle Dd is used at a predetermined timing after a starting of a braking. The increasing duty cycle Du is used when the rotational velocity ω of the spool 12 reaches a brake starting rotational velocity ωs after a starting of a braking. The increasing duty cycle Du is proportional to the rotational velocity ω of the spool 12. The rotational velocity ω of the spool 12 increases until it reaches the maximum rotational velocity ωmax during a casting. Hence, the increasing duty cycle Du gradually increases. When the rotational velocity ω of the spool 12 reaches the maximum rotational velocity ωmax, the decreasing duty cycle Dd is used thereafter. When the rotational velocity ω of the spool 12 reaches the maximum rotational velocity ωmax, the decreasing duty cycle Dd increases to the maximum braking force, and then, gradually reduces with an elapse of time t. It should be noted that the magnitude of the maximum braking force herein depends on the braking modes.

When a casting is started and the spool 12 is rotated, electric power is supplied to the spool control unit 24 from the electric storage element 51, and a spool control is started. When electric power is supplied to the spool control unit 24, data of the increasing duty cycle Du, depicted with bold line, and the decreasing duty cycle Dd, depicted with broken line, are read out of the storage 26 in accordance with a brake mode. The brake mode is selected in accordance with the operating position of the first selector 32 and that of the second selector 34. The data of the increasing duty cycle Du and the decreasing duty cycle Dd are set in the spool controller 25. At this time, as depicted with a solid line in FIG. 8, the rotational velocity ω of the spool 12 becomes the brake starting rotational velocity ωs in an early stage of a casting. This timing is the timing to start a braking. The brake starting rotational velocity ωs falls in a range of, for instance, 4000 to 6000 rpm. In the present preferred embodiment, the brake starting rotational velocity ωs is set to be 4000 rpm.

The spool controller 25 calculates the rotational velocity ω and the rotational acceleration ωa based on an output from the rotation detector 31 and estimates the tension F based on the calculated rotational acceleration ωa ($=\Delta\omega/\omega t$). Additionally, the spool controller 25 estimates the maximum rotational velocity ωmax based on a time-series variation in the rotational velocity ω.

Figure 9:
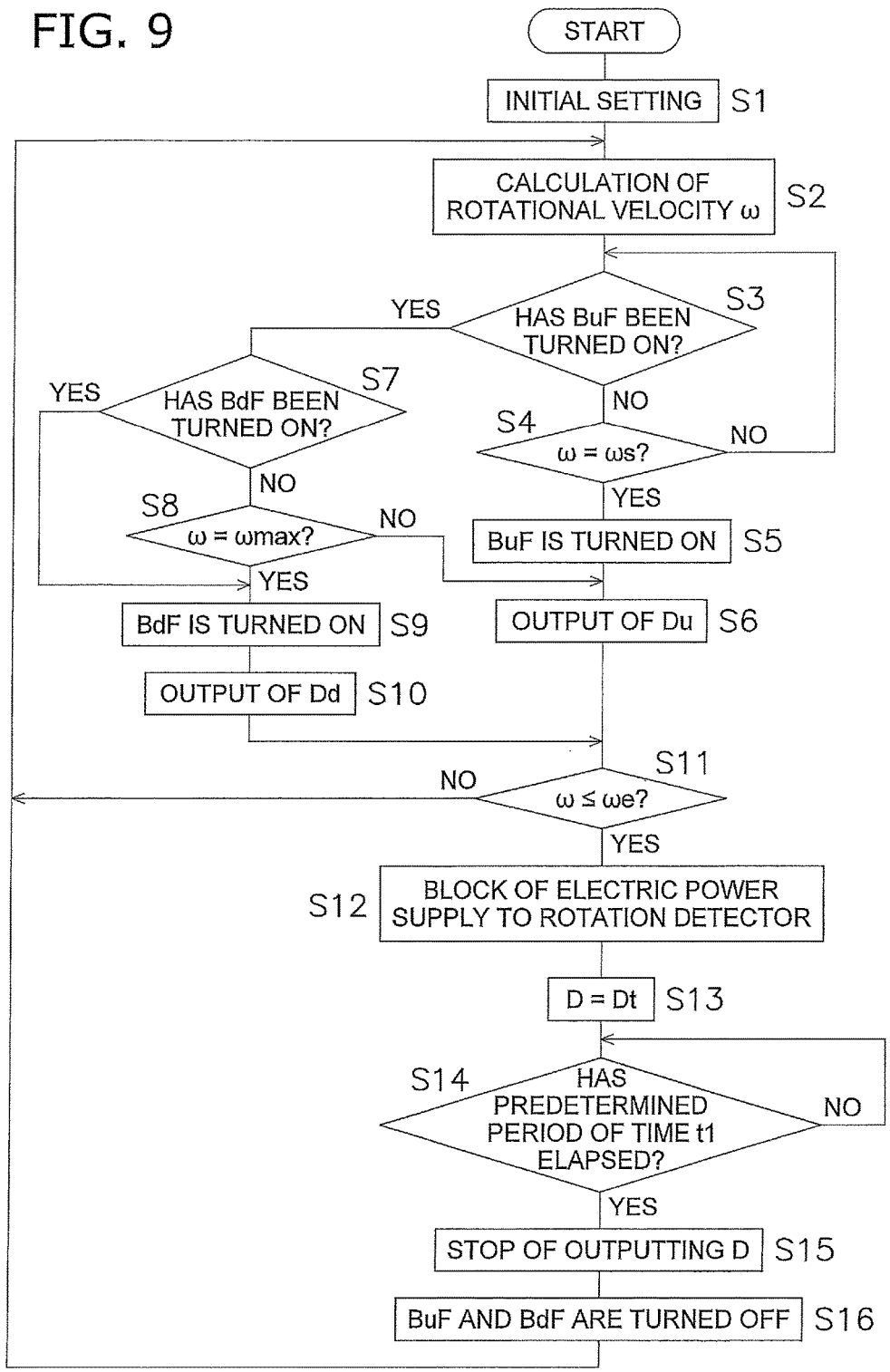
FIG. 9 is a flowchart showing an exemplary control action of a spool controller.

Next, a spool control action will be specifically explained based on the flowchart of FIG. 9. It should be noted that the control flowchart shown in FIG. 9 is an exemplary control action, and the control action of the present disclosure is not limited to this.

When the spool 12 is rotated by casting, electric power is stored in the electric storage element 51 and is supplied to the spool controller 25. When the voltage of electric power to be outputted from the electric storage element 51 then exceeds a reset voltage, the spool controller 25 performs an initial setting in step S1 of FIG. 9. Then, the processing proceeds to step S2. In the initial setting, the spool controller 25 resets a variety of items (flag, timer, data, etc.). In step S2, the spool controller 25 calculates the rotational velocity ω based on a pulse outputted from the rotation detector 31. Then, the processing proceeds to step S3.

In step S3, the spool controller 25 determines whether or not a flag BuF has been already turned on. The flag BuF indicates that the brake processing with the increasing duty cycle Du has been already started. When the controller 25 determines that the brake processing with the increasing duty cycle Du has not been started yet (i.e., the flag BuF has been turned off), the processing proceeds from step S3 to step S4. In step S4, the spool controller 25 determines whether or not the rotational velocity ω has reached the brake starting rotational velocity ωs. Specifically, the spool controller 25 calculates the rotational velocity ω based on the pulse outputted from the rotation detector 31 in a time-series manner. Based on this data, the spool controller 25 obtains the brake starting rotational velocity ωs. The spool controller 25 sets this timing as the brake starting timing. Therefore, when the rotational velocity ω has reached the brake starting rotational velocity ωs, the processing proceeds from step S4 to step S5.

In step 55, the spool controller 25 turns on the flag BuF indicating that the brake processing with the increasing duty cycle Du has been started. Then, the processing proceeds from step S5 to step S6. In step S6, the spool controller 25 outputs the aforementioned increasing duty cycle Du to the switch element 48 and performs an on/off control of the switch element 48 with the outputted duty cycle. Then, the processing proceeds from step S6 to step S11.

When the spool controller 25 determines that the rotational velocity ω has not reached the brake starting rotational velocity ωs, the processing proceeds from step S4 to step S3. In step S3, when the spool controller 25 determines that the flag BuF has been already turned on, in other words, when the spool controller 25 determines that the brake processing with the increasing duty cycle Du has been already started, the processing proceeds from step S3 to step S7. In step S7, the spool controller 25 determines whether or not a flag BdF has been already turned on. The flag BdF indicates that the brake processing with the decreasing duty cycle Dd has been already started. When the spool controller 25 determines that the brake processing with the decreasing duty cycle Dd has not been started yet (i.e., the flag BdF has been turned off), the processing proceeds from step S7 to step S8. In step S8, the spool controller 25 determines whether or not the rotational velocity ω of the spool 12 has reached the maximum rotational velocity ωmax. Specifically, the spool controller 25 calculates the rotational velocity ω based on the pulse outputted from the rotation detector 31 in a time-series manner. Based on this data, the spool controller 25 estimates the maximum rotational velocity ωmax. When the spool controller 25 determines that the rotational velocity ω of the spool 12 has not reached the maximum rotational velocity ωmax yet, the processing proceeds from step S8 to step S6. Then, the spool controller 25 controls the spool 12 with the increasing duty cycle Du. When the spool controller 25 determines that the rotational velocity ω of the spool 12 has reached the maximum rotational velocity ωmax, the processing proceeds from step S8 to step S9. In step S9, the spool controller 25 turns on the flag BdF indicating that control with the decreasing duty cycle Dd has been already started. In step S10, the spool controller 25 outputs the decreasing duty cycle Dd to the switch element 48, and the processing proceeds to step S11.

In step S11, the spool controller 25 determines whether or not the rotational velocity ω of the spool 12 has decreased to a water landing determining rotational velocity ωe or less. The water landing determining rotational velocity ωe is set for determining a water landing of the terminal tackle. The water landing determining rotational velocity ωe is set to be, for instance, 2300 rpm. When the spool controller 25 determines that the rotational velocity ω has not been decreased to the water landing determining rotational velocity ωe or less, the processing proceeds from step S11 to step S2. Contrarily, when the spool controller 25 determines that the rotational velocity ω has decreased to the water landing determining rotational velocity ωe or less, the processing proceeds from step S11 to step S12. In step S12, the spool controller 25 controls the electric power breaker 55 to block a supply of electric power to the rotation detector 31, and the processing proceeds from step S12 to step S13. With this control, brake duration is prolonged by saving consumption of electric power stored in the electric storage element 51. In step S13, the spool controller 25 maintains the decreasing duty cycle Dd at a duty cycle Dt for blockage of electric power supply, and the processing proceeds from step S13 to step S14. Accordingly, the braking force is maintained without being reduced after it is determined that the terminal tackle has landed on water.

In step S14, the spool controller 25 stands by until a predetermined period of time t1 (e.g., 0.5 to 1 second) has elapsed. When the predetermined period of time t1 has elapsed, the processing proceeds from step S14 to step S15. In step S15, the spool controller 25 stops the outputting of the duty cycle D, and the processing proceeds from step S15 to step S16. In step S16, the spool controller 25 turns off the flag BuF and the flag BdF, and the processing proceeds from step S16 to step S2. When the output voltage of the electric storage element 51 then becomes lower than the reset voltage of the spool controller 25, the spool controller 25 is reset and ends the brake control. When electric power is supplied to the spool controller 25 from the spool brake unit 22 by the next casting, the spool controller 25 is restarted and performs the brake control until the output voltage of the electric storage element 51 becomes lower than the reset voltage.

Here, when the water landing determiner 30 determines that the terminal tackle has landed on water, the braking force, which has gradually decreased with elapse of time t from a starting of a casting, is maintained at the duty cycle Dt at this point of time. Therefore, the braking force becomes unlikely to vary when it is determined that the terminal tackle has landed on water. Accordingly, an impact on a user is prevented.

<Other Preferred Embodiments>

One preferred embodiment of the present disclosure has been explained above. However, the present disclosure is not limited to the above, and a variety of changes can be made without departing from the scope of the present disclosure. Especially, a plurality of embodiments and modifications described in the present specification can be arbitrarily combined on an as-needed basis.

(a) In the aforementioned preferred embodiment, supply of electric power to the rotation detector 31 is blocked after it is determined that the terminal tackle has landed on water. However, a supply of electric power to the rotation detector 31 can be unblocked.

(b) In the aforementioned preferred embodiment, whether or not the terminal tackle has landed on water is determined based on the rotational velocity outputted from the rotation detector 31. However, in the present disclosure, the criterion for determining whether or not the terminal tackle has landed on water is not limited to the rotational velocity. A rotational acceleration can be calculated based on the output from the rotation detector 31. Then, whether or not the terminal tackle has landed on water can be determined based on the calculated rotational acceleration. Alternatively, the tension F can be estimated based on the output from the rotational detector 31, and whether or not the terminal tackle has landed on water can be determined based on the estimated tension F.

(c) In the aforementioned preferred embodiment, the brake control is performed with the decreasing duty cycle Dd. However, the decreasing duty cycle Dd can be corrected in accordance with the estimated tension F. In this case, the corrected decreasing duty cycle Dd is maintained after a water landing of the terminal tackle.

<Features>

The aforementioned preferred embodiment can be expressed as follows.

(A) The spool brake mechanism 20 for the dual-bearing reel 100 is a device that brakes the spool 12 capable of winding thereabout a fishing line having a terminal tackle attached to a tip of the fishing line. The spool brake mechanism 20 for the dual-bearing reel 100 includes the spool brake unit 22, the spool controller 25, the rotation detector 31 and the water landing determiner 30. The spool brake unit 22 can electrically brake the spool 12 during a releasing of the fishing line. The spool controller 25 electrically controls the braking force of the spool brake unit 22. The rotation detector 31 can electrically detect the rotation of the spool 12. The water landing determiner 30 determines whether or not the terminal tackle has landed on water based on an output from the rotation detector 31 after a starting of a casting. When the water landing determiner 30 determines that the terminal tackle has landed on water, the spool controller 25 controls the spool brake unit 22 such that the braking force is maintained at a magnitude at a point of time of the determination made by the water landing determiner 30 that the terminal tackle has landed on water.

According to the spool brake mechanism 20, the water landing determiner 30 determines whether or not the terminal tackle has landed on water based on the output from the rotation detector 31 after a casting, and determines that the terminal tackle has landed on water, for instance, when the rotational velocity of the spool 12 becomes slow. When the water landing determiner 30 determines that the terminal tackle has landed on water, the spool controller 25 controls the spool brake unit 22 such that the braking force is maintained at a magnitude at this point of time. When the water landing determiner 30 herein determines that the terminal tackle has landed on water, the braking force is maintained at a magnitude at this point of time. Hence, the braking force becomes unlikely to vary during a water landing of the terminal tackle. Accordingly, an impact on a user is prevented.

(B) The spool brake mechanism 20 for the dual-bearing reel 100 can further include the rotational velocity calculator 28 to calculate the rotational velocity $\omega$ of the spool 12 based on the rotation of the spool 12 detected by the rotation detector 31. The water landing determiner 30 can determine that the terminal tackle has landed on water when the calculated rotational velocity $\omega$ is less than or equal to the water landing determining rotational velocity $\omega e$. According to this construction, a water landing of the terminal tackle can be determined based on the rotational velocity $\omega$ that gradually reduces. Hence, it is possible to simplify an algorithm for determining the water landing of the terminal tackle.

(C) When the rotational velocity $\omega$ of the spool 12 becomes greater than the maximum rotational velocity $\omega max$ after a casting, the spool controller 25 can control the spool brake unit 22 such that the braking force (the decreasing duty cycle Dd) gradually reduces with reduction in the rotational velocity $\omega$ of the spool 12. According to this configuration, a surplus braking force is unlikely to act on the spool 12 during a flying of the terminal tackle. Hence, the terminal tackle can fly a long distance.

(D) The spool brake mechanism 20 for the dual-bearing reel 100 can further include the electric power breaker 55 to block a supply of electric power to the rotation detector 31 when the water landing determiner 30 determines that the terminal tackle has landed on water. According to this construction, the amount of electric power to be consumed by the rotation detector 31 can be reduced, and the duration of the brake control can be extended.

(E) The spool controller 25 can stop controlling the spool brake unit 22 when the predetermined period of time t1 elapses after the determination made by the water landing determiner 30 that the terminal tackle has landed on water. According to this construction, the braking force does not act on the spool 12 in winding the fishing line. Hence, the fishing line can be easily wound up. Additionally, when a supply of the electric power to the rotation detector 31 is reactivated at this timing, preparation of the brake control can be made for the next casting.

What is claimed is:

1. A spool brake device for a dual-bearing reel, the spool brake device comprising:
   a spool brake configured to electrically brake a spool during a releasing of a fishing line by applying a braking force to the spool;
   a rotation detector configured to electrically detect a rotation of the spool; and
   a spool controller configured
   to determine whether a terminal tackle has landed on water based on an output from the rotation detector after a starting of a casting, and to control the spool brake such that the braking force is maintained at a magnitude when a determination that the terminal tackle has landed on water, the magnitude equal to a magnitude of the braking force at a point of time the determination is made that the terminal tackle has landed on water.

2. The spool brake device according to claim 1, wherein the spool controller is further configured
   to calculate a rotational velocity of the spool based on the rotation of the spool detected by the rotation detector, and
   to determine that the terminal tackle has landed on water upon a determination that the calculated rotational velocity is less than or equal to a predetermined value.

3. The spool brake device according to claim 2, wherein the spool controller is further configured to control the spool brake such that the braking force is gradually reduced according to a reduction in the rotational velocity of the spool upon a determination that the rotational velocity of the spool is greater than a maximum value after the starting of the casting.

4. The spool brake device according to claim 1, further comprising:
   an electric power breaker configured to block a supply of an electric power to the rotation detector upon the determination that the terminal tackle has landed on water.

5. The spool brake device according to claim 1, wherein the spool controller is further configured to stop outputting a duty cycle after a predetermined period of time elapses after the determination that the terminal tackle has landed on water.

6. The spool brake device according to claim 1, wherein the spool controller is further configured
   to calculate a tension of the fishing line based on the rotation of the spool detected by the rotation detector, and
   to determine that the terminal tackle has landed on water upon a determination that the calculated tension of the fishing line is less than or equal to a predetermined value.

7. A non-transitory computer readable medium, having stored thereon instructions that, when executed by a processor, cause the processor to perform operations comprising:
   detecting a rotation of a spool;
   controlling a spool brake to apply a braking force to the spool after a starting of a casting;
   determining whether a terminal tackle has landed on water based on an output from a rotation detector after the starting of the casting; and
   controlling the spool brake such that the braking force is maintained at a magnitude when a determination that the terminal tackle has landed on water, the magnitude equal to a magnitude of the braking force at a point of time the determination is made that the terminal tackle has landed on water.

8. The non-transitory computer readable medium according to claim 7, the operations further comprising:
   calculating a rotational velocity of the spool based on the detecting of the rotation of the spool; and
   determining that the terminal tackle has landed on water upon a determination that the calculated rotational velocity is less than or equal to a predetermined value.

9. The non-transitory computer readable medium according to claim 8, the operations further comprising:
   controlling the spool brake such that the braking force is gradually reduced according to a reduction in the rotational velocity of the spool upon a determination that the rotational velocity of the spool is greater than a maximum value after the starting of the casting.

10. The non-transitory computer readable medium according to claim 7, the operations further comprising:
    blocking a supply of electric power upon the determination that the terminal tackle has landed on water.

11. The non-transitory computer readable medium according to claim 7, the operations further comprising:
    stopping an output of a duty cycle after a predetermined period of time elapses after the determination that the terminal tackle has landed on water.

12. The non-transitory computer readable medium according to claim 7, the operations further comprising:
    calculating a tension of a fishing line based on the rotation of the spool detected by the rotation detector, and
    determining that the terminal tackle has landed on water upon a determination that the calculated tension of the fishing line is less than or equal to a predetermined value.

13. A spool brake device for a dual-bearing reel, the spool brake device comprising:
    a spool brake configured to electrically brake a spool during a releasing of a fishing line by applying a braking force to the spool;
    rotation detecting means for detecting a rotation of the spool; and
    spool brake controlling means
    for determining whether a terminal tackle has landed on water based on an output from the rotation detecting means after a starting of a casting, and
    for controlling the spool brake such that the braking force is maintained at a magnitude when a determination that the terminal tackle has landed on water, the magnitude equal to a magnitude of the braking force at a point of time the determination is made that the terminal tackle has landed on water.

14. The spool brake device according to claim 13, wherein the spool brake controlling means further
    calculates a rotational velocity of the spool based on the rotation of the spool detected by the rotation detecting means, and
    determines that the terminal tackle has landed on water upon a determination that the calculated rotational velocity is less than or equal to a predetermined value.

15. The spool brake device according to claim 14, wherein the spool brake controlling means controls the spool brake such that the braking force is gradually reduced according to a reduction in the rotational velocity of the spool upon a determination that the rotational velocity of the spool is greater than a maximum value after the starting of the casting.

16. The spool brake device according to claim 13, further comprising:

electric power breaking means for blocking a supply of electric power to the rotation detecting means upon the determination that the terminal tackle has landed on water.

17. The spool brake device according to claim 13, wherein the spool brake controlling means stops outputting a duty cycle after a predetermined period of time elapses after the determination that the terminal tackle has landed on water.

18. The spool brake device according to claim 13, wherein the spool brake controlling means calculates a tension of the fishing line based on the rotation of the spool detected by the rotation detecting means, and determines that the terminal tackle has landed on water upon a determination that the calculated tension of the fishing line is less than or equal to a predetermined value.

* * * * *